United States Patent [19]

Miura et al.

[11] Patent Number: 4,972,402
[45] Date of Patent: Nov. 20, 1990

[54] OPTICAL CARD

[75] Inventors: Kyo Miura, Sagamihara; Hisaaki Kawade, Yokohama; Yoshihiro Ogawa, Sagamihara, all of Japan

[73] Assignee: Canon Kabushiki Kaisha, Tokyo, Japan

[21] Appl. No.: 121,041

[22] Filed: Nov. 16, 1987

[30] Foreign Application Priority Data

Nov. 20, 1986 [JP] Japan ............................... 61-275357
Jul. 20, 1987 [JP] Japan ............................... 62-179126

[51] Int. Cl.$^5$ ...................... G11B 3/70; G11B 5/84; G11B 7/26
[52] U.S. Cl. ............................... 369/275.1; 369/283; 369/288
[58] Field of Search .................. 369/275, 283, 288

[56] References Cited

U.S. PATENT DOCUMENTS

| 4,584,259 | 4/1986 | Mayer et al. | 369/275 |
| 4,587,533 | 5/1986 | Nakane et al. | 369/275 |
| 4,606,018 | 8/1986 | Sugiki et al. | 369/275 |
| 4,748,609 | 5/1988 | Yonezawa et al. | 369/275 |

FOREIGN PATENT DOCUMENTS

| 237873 | 9/1987 | European Pat. Off. | 369/275 |
| 8304335 | 12/1983 | PCT Int'l Appl. | 369/275 |

OTHER PUBLICATIONS

IBM Tech. Discl. Bull.; vol. 25, No. 11A; Marks et al.; "Distillation Optical Storage"; Apr. 1983; pp. 5523, 5524.

Primary Examiner—William L. Sikes
Assistant Examiner—Robert E. Wise
Attorney, Agent, or Firm—Fitzpatrick, Cella, Harper and Scinto

[57] ABSTRACT

An optical card has a track portion and a track groove portion as the guide groove on a substrate which can be irradiated with coherent light in shape of a spot to detect the tracking signal from its reflected light, characterized in that the reflectance at the track groove portion is formed lower than the reflectance at the track portion.

10 Claims, 2 Drawing Sheets

OPTICAL CARD

BACKGROUND OF THE INVENTION

1. Field of the Invention

The present invention relates to an optical card.

2. Related Background Art

In recent years, with the progress of information-oriented society, as the means for handling numerous and various kinds of informations with good efficiency, there have been proposed a large number of information recording carriers and devices for recording and reproduction of informations which perform recording or reproduction of optical informations such as optical disc, optical card, optical tape, etc. As the above information recording carrier, there is one in which the information converted into quantized values is detected by conversion into the change in intensity of reflected light accompanied with change in reflectance, change in surface shape due to presence of a pit.

As the recording carrier depending on the change in optical reflectance, there has been proposed the so called heat mode recording material in which the recording layer is irradiated with an energy beam such as laser beam in shape of a spot, whereby a part of the recording layer is changed in state to effect recording. These recording materials are the so called DRAW (direct read after write) media, which can "direct read after write" without requiring development processing, etc. after writing of the information, enabling high density recording and also additional writing.

In devices for recording and reproduction of optical informations, there is the system in which grooves are previously formed at certain intervals for track servo of writing and reading. According to this system, since the grooves play a role as the guide for reading, the track control precision of laser beam is improved, whereby higher speed access than in the system by use of grooveless substrate of the prior art becomes possible.

For formation of track grooves on a substrate, when the substrate is a thermoplastic resin, there have been known in the art the method in which a stamper pattern is heat transferred according to the method such as injection molding or hot press molding at a temperature higher than the melting point, or the method in which a photocurable resin is coated on the substrate, a stamper pattern is closely adhered thereon and said photocurable resin composition is cured by irradiation of UV-ray, etc., thereby phototransferring the stamper pattern.

Next, description is made by referring to an example of optical as the optical information recording carrier. FIG. 1 is a schematic sectional view of the optical card of the prior art. In FIG. 1, 1 is a substrate, 2 a track groove portion, 3 an optical recording layer, 4 an adhesive layer and 5 a protective substrate.

In FIG. 1, recording and reproduction of information are performed by optical writing and reading through the substrate 1 and the track groove portion 2. In the optical card of the prior art, in the case of the heat transfer method as described above, the track groove portion 2 is integrally made with the substrate 1 to be made of the same material, while in the case of the optical transfer method, the track groove portion 2 is not made of the same material as in the substrate but under the adhered state. In either case, the track groove corresponding to the guide groove for light is previously formed so as to perform tracking through the phase difference of laser beam by utilizing fine unevenness. Also, an optical recording layer 3 is formed on the track groove portion 2 and a protective substrate 5 is plastered through an adhesive layer 4. Thus, the optical card can be easily prepared.

In the method of tracking for the above optical card, laser beam is irradiated in a spot so as to stride across a track groove, whereby tracking is effected by utilizing the phase difference of reflected light through unevenness of the track groove portion.

Also, on the substrate is provided a recording layer subjected to patterning without provision of a track groove which will give rise to phase difference, thereby effecting tracking by utilizing the dose ratio of reflected lights at the recording layer portion and the portion where no recording layer exists relative to the incident light of the laser beam, namely amplitude.

However, in the former case, tracking servo control is performed by effecting tracking so as to create phase difference in reflected lights in the depth of track groove, the groove width and the track groove, but due to variance in dimensions of the track groove width or unevenness of the track groove, fluctuation of the light source used such as laser beam, etc. and the dose distribution of the laser beam (depending on the spot diameter), etc., there is the problem that the tracking servo control cannot be completely performed only through the phase difference in reflected lights relative to the spot-shaped incident light.

On the other hand, in the latter case, the preparation method is performed by printing, etc. and therefore no fine working can be obtained with good productivity.

Particularly, in an optical card medium, as different from optical disc, etc., recording and reproduction of information are performed by reciprocal movement of optical card medium and parallel movement of laser recording head. Accordingly, in an optical card medium, as compared with the recording and reproduction of information by circular movement as in optical disc, etc., errors for determination of correct recording and reproduction positions during recording and reproduction of information tend to be increased.

For reducing such errors, in an optical card medium, it becomes necessary to obtain a tracking signal of high precision and high quality.

SUMMARY OF THE INVENTION

An object of the present invention is to solve the problems in the prior art example as described above and to provide an optical card capable of obtaining a tracking signal of high performance and high quality.

The above object can be accomplished by an optical card having a track portion and a track groove portion as the guide groove on a substrate which can be irradiated with coherent light in shape of a spot to detect the tracking signal from its reflected light, characterized in that the reflectance at the track groove portion is formed lower than the reflectance at the track portion.

DETAILED DESCRIPTION OF THE INVENTION

Figure 1:
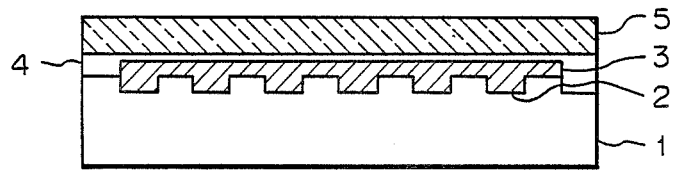
FIG. 1 is a sectional view showing the constitution of the optical card of the prior art.

Referring now to the drawings, representative embodiments of the optical card according to the present invention are to be described.

Figure 2:
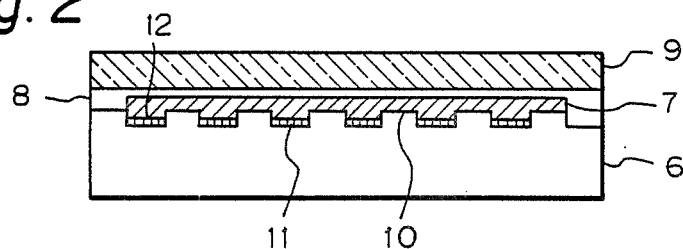
FIG. 2 is a sectional view showing an embodiment of the optical card according to the present invention.

FIG. 2 is a schematic sectional view of one embodiment of the optical card according to the present invention. In FIG. 2, 6 is a transparent substrate, 7 a recording layer, 8 an adhesive layer, 9 a protective substrate, 10 a track portion, 11 a track groove and 12 a low reflection treatment portion applied with low reflection treatment. The groove dimension of the track groove portion 11 should be 20,000 to 40,000 Å in line width, while the line width of the track portion 10 which is the recording portion should preferably be 30,000 to 100,000 Å. The laser beam for recording and reproduction should desirably have a diameter of 3 to 10 μm.

The method for preparation of such optical card according to the present invention shown in FIG. 2 is described below.

First, a resist is coated on the substrate 6, subjected to pattern exposure and the resist is developed to form a resist pattern, followed by etching of the substrate to form a track pattern. During this operation, without peel-off of the resist mask used for formation of the track pattern, a dye, a paint, a pigment, etc. with lower reflectivity than the recording layer 7 such as phthalocyanine can be thinly applied, followed by lift-off of the resist mask, to form a low reflectivity treatment portion 12 applied with low reflectivity treatment only on the track groove 11.

Also, at this time, the track portion 10 may be transparent and also may be constituted of a light-transmissive metal oxide, metal sulfide, metal carbonate, metal nitride, metal fluoride having thermal conductivity at least equal to the substrate 1, for example, high thermal conductivity. In this case, after vapor deposition of, for example, a metal oxide on the substrate 6, a resist pattern is formed by coating, pattern exposure and development of a resist, and subsequently the metal oxide film is etched to form a track pattern. Following sequentially the same procedure as described above, for example, by coating of phthalocyanine without peel-off off of the resist mask followed by lift-off of the resist mask, a low reflection treatment portion 12 can be formed. In the case of such a constitution, a pit with better shape can be obtained during recording. And, next, a recording layer 7 is formed and, further by plastering a protective substrate 9 through an adhesive layer 8 thereon, an optical card according to the present invention can be obtained.

As the substrate 6, those with little inconvenience in optical recording and reproduction are preferred and those having high transmittance to the light employed may be useful. For example, acrylic resins, polyester resins, polycarbonate resins, vinyl type resins, polysulfone resins, polyimide type resins, polyacetal resins, polyolefin resins, polyamide resins, cellulose derivatives, etc. can be used.

As the protective substrate 9, all materials which can be used as conventional protective materials may be available. For example, there may be employed polyvinyl chloride, fluorine-substituted ethylene polymer, vinyl chloride-vinyl acetate copolymer, polyvinylidene chloride, acrylic polymers such as polymethyl methacrylate, etc., polystyrene, polyvinyl butyral, acetyl cellulose, styrene-butadiene copolymer, polyethylene, polypropylene, polycarbonate, epoxyacrylonitrile-butadiene-styrene copolymer, etc.

In some cases, a diversity of materials can be used depending on the uses, including metal sheets such as of iron, stainless steel, aluminum, tin, copper, zinc, etc.; synthetic paper; paper; and also fiber-reinforced plastics; composite materials of metallic powder such as magnetic material, etc. with plastics; ceramics; etc. Of course, those which are used for the substrate 6 may be also used.

When the laser beam is permitted to be incident in the direction opposite to the substrate 6, the substrate 6 is not necessarily required to be transparent.

As the recording layer 7 to be used in the present invention, there may be included organic dyes such as cyanine type dyes, anthraquinone type dyes, melocyanine type dyes, transition metal complexes (e.g. diamine type metal complex, dithiol type metal complex), etc. or those introduced into polymers, and further Bi, Te or alloys of these, etc., chalcogen type compounds and others.

The recording layer can be laminated by coating, vapor deposition, spraying, etc.

Figure 3A:
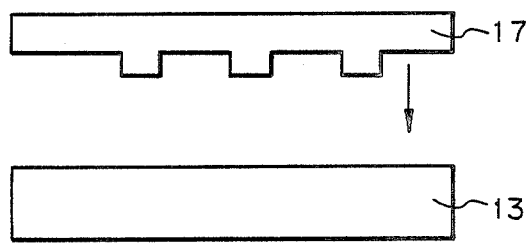
FIGS. 3A to 3C are diagrams of the steps for preparation and a sectional view of an embodiment of the optical card according to the present invention.
Figure 3B:
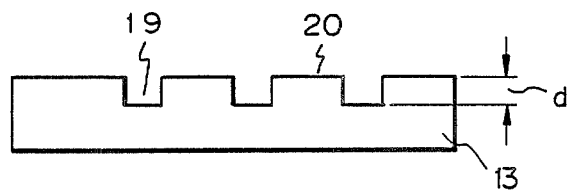
Figure 3C:
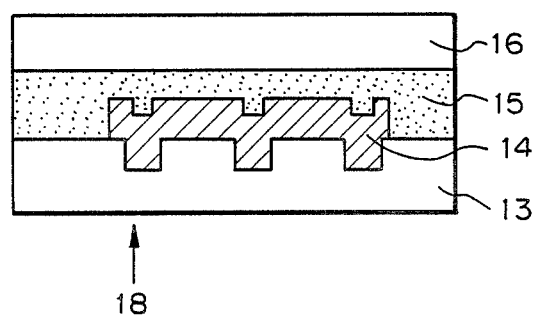

FIG. 3C is a schematic sectional view of another embodiment of the optical card according to the present invention. In FIG. 3C, 13 is a transparent substrate, 14 a recording layer, 15 an adhesive layer, 16 a protective substrate, 19 a track groove portion and 20 a track portion. This embodiment is specifically an optical card having a recording layer on the track groove formed on the substrate, with the track groove for recording and reproduction laser beam having a depth of about 2000 to 6000 Å and a width of 10,000 to 100,000 Å and the recording layer having a film thickness of 800 to 1200 Å at the portion other than the track groove and 1500 Å or more at the track groove portion, whereby the reflectance at the track groove portion 19 becomes lower than that at the track portion 20 and a distinct and high precision tracking signal can be obtained.

In this embodiment, an organic dye should be desirably used in the recording layer 14, particularly preferably a polymethine type dye represented by the following structural formula (I):

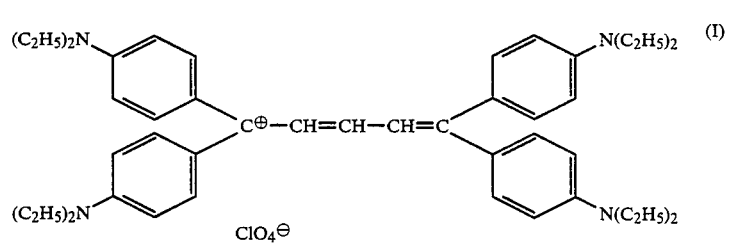

The polymethine type dye to be used in the recording layer, particularly one having the above structure may have a film thickness around 1000 Å at which the reflectance of a semiconductor laser beam becomes the maximum, and a film thickness of 1500 Å or more at which the reflectance value becomes constant at a value approximate to the minimum. Accordingly, the dye is coated on the portion other than the track groove so that the reflectance may become the maximum value, namely the film thickness of the dye layer at the portion other than the track groove may become about 1000 Å. At this time, if the dye layer coated on the track groove portion at the same time can be coated to a film thickness of 1500 Å or more, the dose difference of the reflected light of the later beam between the track groove 19 and the track portion 20 detected by the recording and/or reproduction device of the optical card can be made the maximum.

For satisfying the above condition, the depth of the track groove should be desirably about 2,000 to 6,000 Å, particularly 2,500 to 3,500 Å. On the other hand, the width of the track groove should be desirably 10,000 to 100,000 Å, particularly 10,000 to 60,000 Å.

The polymethine type dye to be used in this embodiment can be also used as the single substance of the dye. Alternatively, additives such as aminium salts, diimonium salts, etc. represented by the formulae (II), (III) shown below can be added for improvement of light resistance of the dye, etc. in the dye solution to be used in coating of the dye, and used as the recording layer.

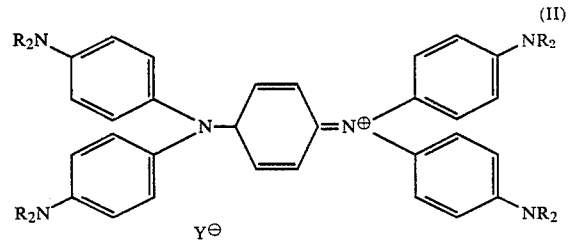

(II)

Aminium salt
R=nBu, Y⊖=ClO₄⊖
R=nBu, Y⊖=AsF₆⊖

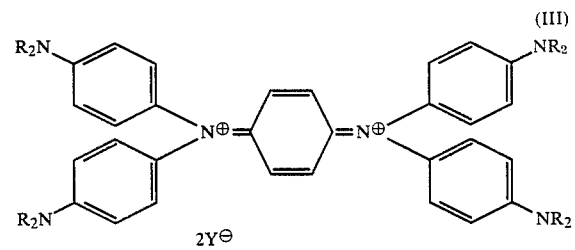

(III)

Diimonium salt
R=lower alkyl group such as methyl, ethyl, propyl, n-butyl, etc.
Y⊖=acid anion such as ClO₄⊖, AsF₆⊖, SbF₆⊖, etc.

In the following, the method for preparation of the embodiment shown in FIG. 3 is to be described.

First, the method for forming the track groove portion 13 is not particularly limited, but, for example, the injection method, the compression method or the 2P method, etc. can be used. Among them, in the injection method and the compression method, track groove is directly formed on the substrate. In the 2P method, after coating of a photocurable resin composition on the substrate 8, with an original plate closely contacted thereon, radiation (UV-ray, X-ray, etc.) is uniformly irradiated on the transparent resin substrate side to cure said resin composition, thereby transferring the pattern of a mold and forming a track groove on said resin composition.

The depth of the track groove can be controlled by use of "mold" used for groove formation or "pattern" comprising an organic material, and the depth of the groove of "mold" or "pattern" can be controlled by the step such as dry etching, etc.

As the substrate 1 used at this time, those with little inconvenience in optical recording and reproduction are preferred and those having high transmittance to the light employed may be useful. For example, acrylic resins, polyester resins, polycarbonate resins, vinyl type resins, polysulfone resins, polyimide type resins, polyacetal resins, polyolefin resins, polyamide resins, cellulose derivatives, etc. can be used. A material corresponding to the method for formation of track groove as described above may be selected from among these.

Next, on the transparent substrate 1 equipped with the track groove formed by use of the above material and the method, a recording layer, preferably a polymethine type dye layer with the structure of the above formula (I) is provided by coating, spraying, etc., followed by provision of the protective substrate 11 through the adhesive layer 15.

As the protective substrate 16, all materials which can be used as conventional protective materials may be available. For example, there may be employed polyvinyl chloride, fluorine-substituted ethylene polymer, vinyl chloride-vinyl acetate copolymer, polyvinylidene chloride, acrylic polymers such as polymethyl methacrylate, etc., polystyrene, polyvinyl butyral, acetyl cellulose, styrene-butadiene copolymer, polyethylene, polypropylene, polycarbonate, epoxyacrylonitrile-butadiene-styrene copolymer, etc.

In some cases, a diversity of materials can be used depending on the uses, including metal sheets such as of iron, stainless steel, aluminum, tin, copper, zinc, etc.; synthetic paper; paper; and also fiber-reinforced plastics; composite materials of metallic powder such as magnetic material, etc. with plastics; ceramics; etc. Of course, those which are used for the substrate 13 may be also used.

When the laser beam is permitted to be incident in the direction opposite to the substrate 13, the substrate 13 is not necessarily required to be transparent.

In the optical card according to the present invention having a constitution as described above, which is an optical card having a track portion and a track groove portion on a substrate and detects a tracking signal by irradiation of coherent light with said track groove as the guide groove, by having a track groove formed with lower reflectance than that other than the track groove, the tracking signal is obtained not only through the phase difference but through overlapping of the both of the phase difference and additional dose ratio of the track groove portion and the track portion, whereby more distinct and higher precision tracking signal than the tracking signal obtained by the respective single component can be obtained.

Also, for performing more effectively detection of the tracking signal through dose ratio of reflected lights, the contrast when the dose ratio of reflected lights is determined as contrast should be desirably 0.45 or more.

Figure 4A:
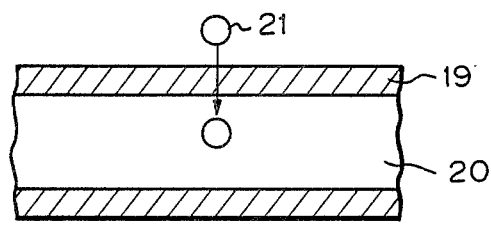
FIGS. 4A and 4B are an illustration view of the contrast of the reflected light.
Figure 4B:
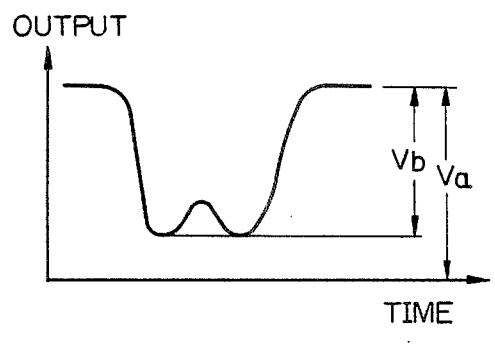

However, the contrast is defined as follows from the wave form (FIG. 4B) when the reflected light quantity when the light spot transverses the track groove (FIG. 4A) is detected by an oscilloscope:

Contrast = $Vb/Va$.

EXAMPLE 1

By use of an acrylic resin as the transparent resin substrate, a resist is applied thereon and the resist after subjected to pattern exposure was developed to form a resist pattern, followed by dry etching to effect etching to a depth of 3000 Å of the acrylic resin substrate, to form a track groove with a depth of 3000 Å and a width of 30,000 Å. Next, without peel-off of the resist mask used for formation of the pattern of the track groove, phthalocyanine was vapor deposited to a thickness of 1000 Å. Then, by lift-off of the resist mask, a low reflectance treated portion 8 was formed only on the track groove 7. After vapor deposition of Te to a thickness of 900 Å thereon, a protective substrate of polycarbonate was adhered through an adhesive layer onto the recording layer side to prepare an optical card with the constitution shown in FIG. 1.

The contrast ratio of reflected light at the track groove portion to that at the track portion in this Example was 0.51, and a tracking signal with high precision could be obtained.

COMPARATIVE EXAMPLE 1

After a track groove with a depth of 3000 Å was formed on the acrylic resin in the same manner as in Example 1, the resist mask was lifted off and Te was vapor deposited to a thickness of 900 Å without provision of the lower reflectance treated portion.

The contrast ratio at this time was 0.31, and no distinct tracking signal could be obtained.

EXAMPLE 2

According to the diagram of the steps shown in FIGS. 3A–3C, an optical card was prepared.

By use of a polycarbonate (Panlite, produced by Teijin Kasei K. K.) as the substrate, as shown in FIG. 3A, a track groove with a depth of d=3000 Å and a width of 30,000 Å was formed on the substrate 13 with a mold 5 formed by dry etching (see FIG. 3B).

Formation of the track groove was performed by the compression molding method under a temperature of 190° C. and a pressure of 900 kg/cm².

Next, on the substrate having the track groove formed thereon, by use of a diacetone alcohol solution of a dye represented by the following formula (I):

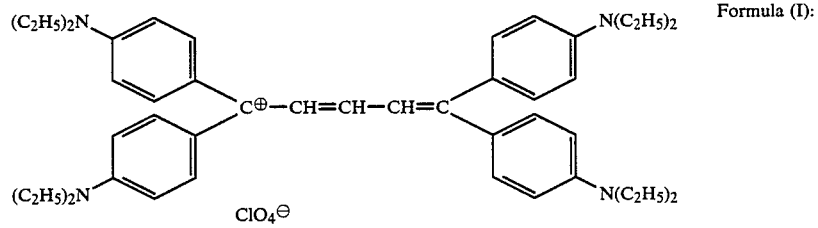

Formula (I):

a recording layer 2 was formed by coating of the solution by a gravure coating method to a film thickness of about 900 Å at the track portion and a film thickness of about 1700 Å at the groove portion 19.

Next, a protective substrate 16 of polycarbonate was laminated through an adhesive layer 15 on the recording layer 14 side to prepare an optical card medium with the constitution shown in FIG. 3C.

For this optical card medium, the difference in amount of light reflected between the track groove portion 19 and the track portion 20 was detected by use of a semiconductor laser beam. As the result, the amount of the light reflected at the groove portion was 10 μW, while that at the track portion was 20 μW. The contrast ratio of reflected light amount at the track groove portion and the track portion was 0.5, and a tracking signal with sufficiently good precision could be obtained. The laser beam having obtained the tracking signal had a spot diameter of 4.5 μm and a power of 0.4 mW.

EXAMPLE 3

After various aluminum salts represented by the formula (II) shown below were added to the dye solution used in Example 2 in amounts of 20 wt. % based on the weight of the dye, various optical cards were prepared according to the same method as in Example 1 and evaluated similarly.

The contrast ratio of reflected light amount at the track groove and the track portion was about 0.49 to give a tracking signal with high precision.

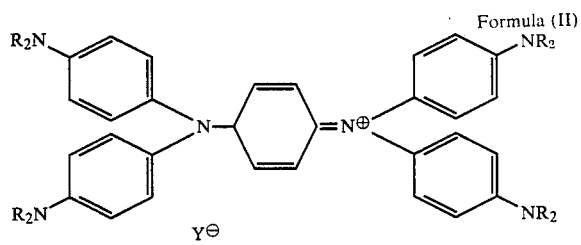

Formula (II)

R=nBu, Y⊖=ClO₄⊖
R=nBu, Y⊖=AsF₆⊖

By use of a mold for compression working made of silicon, a track groove with a depth of about 3000 Å and a width of 50,000 Å was formed on a polymethyl methacrylate (PMMA) substrate. The conditions of the compression working were a temperature of 150° C. and a pressure of 0.3 Torr.

On the track groove formed side of the polymethyl methacrylate substrate equipped with a track groove thus prepared, a recording layer was formed according to the same method as in Example 1 to prepare an optical card medium. The contrast ratio of reflected light amount at the track groove portion and the track portion was about 0.52 to give a tracking signal with sufficiently good precision.

On a polymethyl methacrylate resin, a guide groove with a depth of groove of 1300 Å and a width of 30,000 Å was formed according to the same method as in Example 3 by use of a mold made of silicon with a shallow depth of the convex portion.

On a polymethyl methacrylate substrate with a track groove depth of 1300 Å, a dye was applied according to the same method as in Example 1 to prepare an optical card medium. The contrast ratio of reflected light amount at the track groove portion and the track portion was 0.30. The tracking signal at this time was very bad in precision, and track-off occurred frequently. That is, in the case of a track groove depth of 1300 Å, when the dye is applied on the track portion to a thickness of 900 Å, the film thickness of the track groove portion does not become thick. As described above, by making the depth of the track groove portion 2000 Å or more, a tracking signal with a contrast ratio of 0.45 or more of reflected light amount at the track groove portion and the track portion can be obtained.

What we claim is:

1. An optical card having a track portion and a track groove portion as the guide groove on a substrate which can be irradiated with coherent light in shape of a spot to detect the tracking signal from its reflected light, characterized in that the reflectance at the track groove portion is formed lower than the reflectance at the track portion.

2. An optical card according to claim 1, wherein said track groove portion has a material layer with lower reflectance than the recording layer.

3. An optical card according to claim 1, wherein the recording layer has a thickness of 1500 Å or more at the track groove portion, 800 to 1200 Å at the track portion, and said track groove portion has a depth of 2000 to 6000 Å and a width of 10,000 to 100,000 Å.

4. An optical card according to claim 3, wherein the recording layer is formed by coating.

5. An optical card according to claim 1, wherein the contrast ratio of said track portion to said track groove portion is 0.45 or more.

6. An optical card according to claim 1, wherein the recording layer contains an organic dye.

7. An optical card according to claim 6, wherein said organic dye is a polymethine dye.

8. An optical card according to claim 7, wherein said polymethine dye has the following formula:

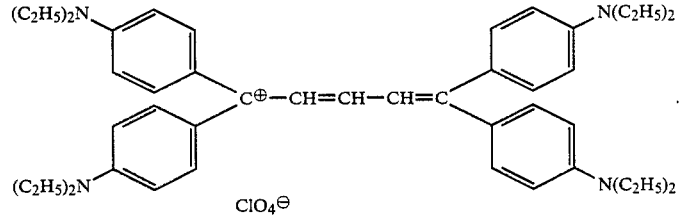

9. An optical card according to claim 6, wherein said organic dye contains an additive therein.

10. An optical card according to claim 1, wherein said track portion comprises a pattern of a light-transmissive inorganic compound with higher thermal conductivity than the substrate.

* * * * *

UNITED STATES PATENT AND TRADEMARK OFFICE
CERTIFICATE OF CORRECTION

PATENT NO. : 4,972,402
DATED : November 20, 1990
INVENTOR(S) : KYO MIURA ET AL.

Page 1 of 2

It is certified that error appears in the above-identified patent and that said Letters Patent is hereby corrected as shown below:

COLUMN 1

Line 22, "so" should read --so---.
    Line 27, "so called" should read --so-called--.
    Line 51, "optical as" should read --optical card as--.

COLUMN 3

Line 47, "off" (first occurrence) should be deleted.

COLUMN 5

Line 14, "later beam" should read --laser beam--.
    Line 63, "tion 13" should read --tion 19--.

COLUMN 6

Line 1, "substrate 8," should read --substrate 13,--.
    Line 12, "substrate 1" should read --substrate 13--.
    Line 22, "transparent substrate 1" should read --transparent substrate 13--.
    Line 27, "protective substrate 11" should read --protective substrate 16--.

COLUMN 7

Line 49, "5" should be deleted.
    Line 66, "recording layer 2" should read --recording layer 14--.

UNITED STATES PATENT AND TRADEMARK OFFICE
CERTIFICATE OF CORRECTION

PATENT NO. : 4,972,402

DATED : November 20, 1990

INVENTOR(S) : KYO MIURA ET AL.

It is certified that error appears in the above-identified patent and that said Letters Patent is hereby corrected as shown below:

COLUMN 9

Line 4, "ample 3" should read --ample 2--.

Signed and Sealed this

Thirteenth Day of October, 1992

Attest:

DOUGLAS B. COMER

Attesting Officer     Acting Commissioner of Patents and Trademarks